(12) United States Patent
Jahnke

(10) Patent No.: US 7,237,071 B2
(45) Date of Patent: Jun. 26, 2007

(54) EMBEDDED SYMMETRIC MULTIPROCESSOR SYSTEM WITH ARBITRATION CONTROL OF ACCESS TO SHARED RESOURCES

(75) Inventor: Steven R. Jahnke, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 188 days.

(21) Appl. No.: 10/259,331

(22) Filed: Sep. 27, 2002

(65) Prior Publication Data

US 2003/0120877 A1    Jun. 26, 2003

Related U.S. Application Data

(60) Provisional application No. 60/342,978, filed on Dec. 20, 2001.

(51) Int. Cl.
*G06F 13/18* (2006.01)
*G06F 13/362* (2006.01)
(52) U.S. Cl. .................. 711/150; 710/40; 710/113; 710/241
(58) Field of Classification Search ........ 709/107, 709/213, 400; 710/22, 23, 25, 28, 45, 51, 710/200, 240, 241, 244; 711/120, 130, 141, 711/142, 144, 145, 147, 151, 152, 158, 167; 712/28, 30, 34, 37, 38, 203
See application file for complete search history.

(56) References Cited

U.S. PATENT DOCUMENTS

| | | | | |
|---|---|---|---|---|
| 5,581,713 | A * | 12/1996 | Myers et al. ............ 710/119 |
| 5,694,538 | A * | 12/1997 | Okazaki et al. ............ 714/15 |
| 5,971,510 | A * | 10/1999 | Lickiss et al. ............ 312/263 |
| 6,647,453 | B1 * | 11/2003 | Duncan et al. ............ 710/306 |
| 6,691,216 | B2 * | 2/2004 | Kelly et al. ............ 711/167 |
| 6,779,036 | B1 * | 8/2004 | Deshpande ............ 709/232 |
| 6,854,081 | B1 * | 2/2005 | Suzuki ............ 714/733 |
| 6,895,479 | B2 * | 5/2005 | Reimer et al. ............ 711/152 |
| 2002/0056030 | A1 * | 5/2002 | Kelly et al. ............ 711/150 |
| 2002/0059502 | A1 * | 5/2002 | Reimer et al. ............ 711/152 |
| 2003/0023794 | A1 * | 1/2003 | Venkitakrishnan et al. . 710/105 |
| 2003/0046495 | A1 * | 3/2003 | Venkitakrishnan et al. . 711/141 |
| 2003/0154369 | A1 * | 8/2003 | Teshima et al. ............ 713/1 |
| 2004/0221082 | A1 * | 11/2004 | Griffin et al. ............ 710/305 |

OTHER PUBLICATIONS

"TMS320C6000 CPU and Instruction Set Reference Guide", Oct. 2000, pp. i to xiii, 1-1 to 1-10, 2-1 to 2-33, 3-1 to 3-142, 5-1 to 5-267 and 6-1 to 6-28.

* cited by examiner

*Primary Examiner*—B. James Peikari
(74) *Attorney, Agent, or Firm*—Robert D. Marshall, Jr.; W. James Brady; Frederick J. Telecky, Jr.

(57) ABSTRACT

A single chip, embedded symmetric multiprocessor (ESMP) having parallel multiprocessing architecture composed of identical processors includes a single program memory. Program access arbitration logic supplies an instruction to a single requesting central processing unit at a time. Shared memory access arbitration logic can supply data from separate simultaneously accessible memory banks or arbitrate among central processing units for access. The system may simulate an atomic read/modify/write instruction by prohibiting access to the one address by another central processing unit for a predetermined number of memory cycles following a read access to one of a predetermined set of addresses in said shared memory.

3 Claims, 4 Drawing Sheets

EMBEDDED SYMMETRIC MULTIPROCESSOR SYSTEM WITH ARBITRATION CONTROL OF ACCESS TO SHARED RESOURCES

This application claims priority based on Provisional Application Ser. No. 60/342,978, filed on Dec. 20, 2001.

TECHNICAL FIELD OF THE INVENTION

The technical field of this invention is computer systems and more particularly multiprocessor computer systems.

BACKGROUND OF THE INVENTION

As each generation of silicon process technology has provided increasing integration density using smaller geometry transistors, central processing unit architects have continually debated how to use the additional device area to increase application performance. With smaller, lower capacitance transistors, the operating frequency has proportionally increased, yielding a direct performance gain. However, the access time of the memory function that holds the application program has not kept pace with the speed increases in the central processing unit. This is illustrated in FIG. 1. Memory speed improvement 101 has been gradual. Central processing unit speed improvement 102 has been more marked.

As a result, the performance gain that should be realizable from central processing unit operating frequency advances cannot be achieved without corresponding architectural enhancements in the central processing unit program memory path. As noted in FIG. 1, the speed difference between memory and processors has greatly increased in the past few years. As this gap continues to grow, the memory central processing unit interface will have an even greater effect on overall system performance. The traditional solution to reduce the effect of the central processing unit memory interface bottleneck is to use some form of memory hierarchy. In a general-purpose application processor, a cache system is employed that will allow the hardware at run time to keep copies of the most commonly used program elements in faster, internal RAM. In a more deeply embedded, performance sensitive application (such as a DSP), a form of tightly coupled memory is used that will allow the software to copy either a part of or all of the application program into on-chip RAM. In both of these techniques, the hardware architect gains system performance by the direct, brute force method of simply increasing clock frequency. This solution has proven successful because the performance gains by process technology alone have proved enough for current embedded applications, and there is no impact on application developers to migrate to a faster higher performance system.

It is important, for the clear exposition of processor techniques that follow, to define first the term embedded processor system (EPS) as employed here and as differentiated from a conventional non-embedded multi-chip processor system (MOPS). An embedded processor system includes a processor system integrated on a single chip having one or more central processing units plus a full complement of functional features and functional elements. This full complement of features includes features not normally included in conventional non-embedded multi-chip processor systems (MOPS). The MOPS is formed from one or more single chip central processing units and additional packaged devices performing memory, interface and peripheral circuits and these are assembled on a printed-wire board (PWB).

Additionally we define the embedded multiprocessor system (EMPS) as having multiple central processing units, complex memory architectures and a wide range of peripheral devices all fully integrated on a single chip. Such a system normally includes another special peripheral, an external memory interface (EMIF) coupled to a large amount of external memory. Central processing unit interactions and cache interactions on an embedded processor clearly involve more complex functionality when compared to a non-embedded processor device. Further, the embedded multiprocessor is typically used in a real-time environment leading to additional requirements for the coherent handling of interrupt operations and power consumption control.

The design methodologies used to support existing processors create a bottleneck in the ability for central processing unit designers to maximize frequency gain without extraordinary effort. At the same time the type of applications being considered for next generation embedded processors grows significantly in complexity. Application performance demand outpaces the ability of designers to efficiently provide performance through operating frequency alone at a reasonable development cost.

The disparity between embedded processor application performance requirements and performance gain through operating frequency alone has not gone unnoticed. In many new digital signal processors, two distinct paths have been used to affect increased system performance. The first technique is the use of enhanced central processing unit architectures having instruction level parallelism and the second technique is the use of system task specialization among different types of simpler but more specialized processors. These two paths are outlined below.

The Texas Instruments TMS320C6000 family of digital signal processors provides an example demonstrating the use of an effective central processing unit architecture to gain performance. Many of these devices use a form of instruction level parallelism (ILP) called very long instruction word (VLIW) to extract a performance gain by analyzing the code behavior at the most basic instruction level. The compiler effectively schedules unrelated instructions to be executed in two or more parallel processing units. This allows the processor to do work on more than one instruction per cycle. Since the instruction scheduling and analysis is done by the compiler, the hardware architecture can be simplified somewhat over other forms of instruction level parallelism ILP, such as super-scalar architectures.

Due to this emphasis on the compiler-based performance extraction, there is little impact on the task of application programmers. Application development can be done in a high-level language and be compiled normally. This is done in a non-ILP based system. This ease of application development, coupled with a performance gain without an operating frequency increase has resulted in the success of this form of enhancement. However, these benefits do not come without cost. Both the development effort in creating a new instruction set architecture (ISA), along with the compiler optimizations required are significant. In the future, once the underlying architecture is fixed, the only means of gaining additional performance is by increasing operating frequency.

Other Texas Instruments digital signal processors, the so-called OMAP devices and the TMS320C5441 provide examples of the technique of breaking the target application into fundamental domains and targeting a simpler processor to each domain. Based on system analysis, the system architect breaks the total application into smaller parts and puts together a separate programming plan for each central processing unit in place. In the past, this could have been done only at the board level, where a specialized processor would be targeted for a specific application task. However, the integration density offered by current process enhancements allows these specialized central processing units to be placed on a single die. This enables a tighter coupling between the processors. Fundamentally, the application developer writes code as if he or she was dealing with each processor as an independent platform.

The programmer must be cognizant of the hardware architecture and program each processor independently. Greater coupling between the integrated processors allows for a more efficient passing of data than at the board level. However, the application is primarily written with the focus on the separate processors in the system. Code reuse and porting is difficult even among the processors in the same system, because each processor is really the centerpiece of its subsystem. Each processor may have a different memory map, different peripheral set and perhaps even a different instruction set (such as OMAP). In applications that have very distinct boundaries, such as a cell phone, this method of extracting performance is unparalleled. Each part of the application can be targeted to an optimized processor and programmed independently.

Development efforts are reduced somewhat since a new instruction set is not required to gain performance. However, from an application development and road map perspective, this technique does not offer the ease of use that instruction level parallelism offers. In many applications, there is no clear line where to divide the work. Even when done, the system cannot easily use all the performance of each central processing unit. If one central processing unit is idle while another is very busy, it is difficult to readjust central processing unit loading once the code has been written. If tighter coupling between the system processors is desired, significant software overhead must be added to insure data integrity.

SUMMARY OF THE INVENTION

It is desirable to define an architecture that has the same ease-of-use in the programming model as a single central processing unit system, but offers the modularity and flexibility that the multiprocessor system offers. This method would make possible the code development and reuse advantages of a single processor system, but also realize the lower development cost and scalability of a multiprocessor system. The parallel processing system of this invention operating at the software process level has been developed to achieve these goals.

The embedded symmetric multiprocessor (ESMP) of this invention is a hardware architecture that allows the end user to write application code for a single processor case. In this invention, this code can be directly portable to a multiprocessor. An embedded symmetric multiprocessor has two main features: (1) all the processors and a full range auxiliary functions are implemented all on a single chip; and (2) the tightly coupled matched processors are able to perform totally equivalent operations. With application development on a multiprocessor system requiring a comparable amount of effort as the single processor case, both power dissipation and performance can be better controlled in a multiprocessor system over a single processor system and with minimal application development impact. The combination of better system performance, power control, lower silicon development effort and minimal end-user development impact leads, in some cases, to a parallel processing architecture being a better solution than a new, higher performance single processor solution.

The embedded symmetric multiprocessor system will typically include a full complement of functional features such as multiple central processing units, complex multi-level, shared and unshared memory architectures and a wide range of peripheral devices. The product requirements will dictate the combination of these devices required. Such a system typically includes an interface to a large amount of external memory.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
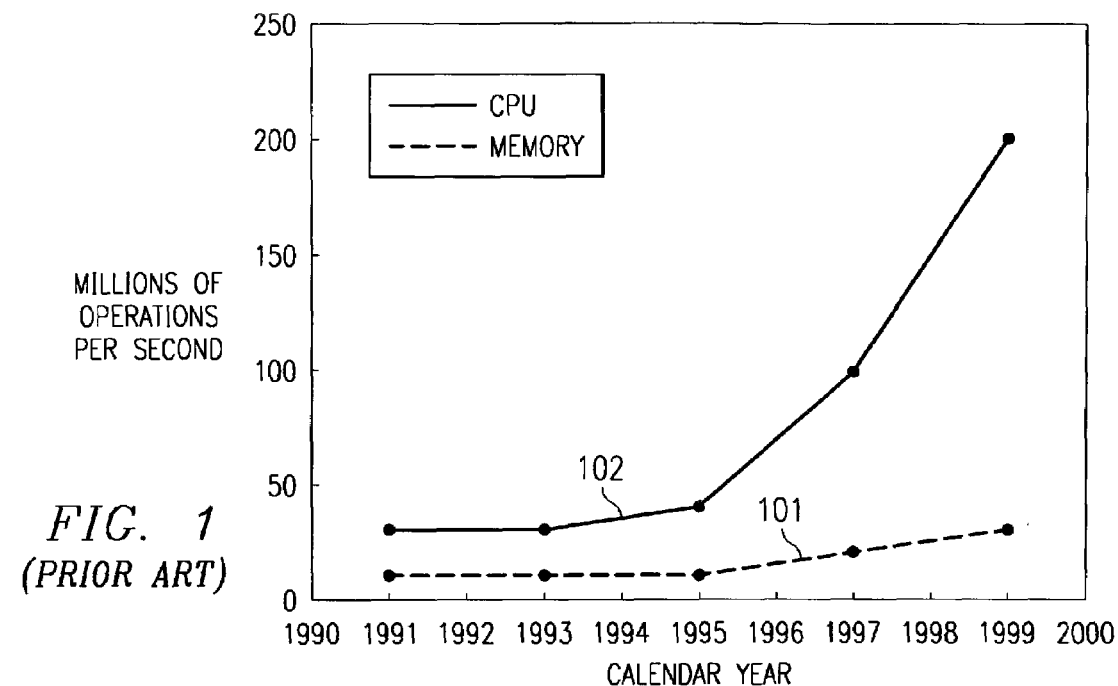
FIG. 1 illustrates the progress in speed performance of memory and central processor units in recent years according to the prior art.

The embedded symmetric multiprocessor system (ESMP) of this invention includes a powerful set of central processing unit-memory-peripheral functions densely integrated at the chip level. While some common multi-chip symmetric multiprocessor systems (MCSMP) are generally available at the board level now, the designer of MCSMP systems typically employs plural standard third or fourth generation central processing unit chips for the base processors. Two or more of these on standard processors are disposed on a mother-board and then connected by way of a commonly available bus interface device to a separate traffic controller and memory controller. Such systems use discrete interface and controller components and central processing unit-memory architectures at the board level. This combination of devices has a set of system interconnect requirements and concerns completely different from and often more troublesome than the embedded symmetric multiprocessor system (ESMP) of this invention. This invention has all interconnects of major importance implemented compactly at the chip level.

Conventional symmetric processor systems (CSMP) have been designed employing having two or more central processing units on the same die, cache architectures that include local unshared L1 caches for each central processing unit and generally an L2 cache shared by both central processing units. However, few if any conventional CSMP systems are available that have both the kind of primary memory normally present on the hard disc drive of a conventional desktop computer and include a wide range of peripheral devices. We are labeling these conventional symmetric processor systems (CSMP) as non-embedded as they most often have simply a central processing unit-memory architecture with no peripheral system components. Processor designers have only recently initiated experimentation and research in the area of these higher complexity systems that include the full range of peripheral devices.

An embedded symmetric processor system (ESMP) includes the full complement of functional features and functional elements, such as peripheral functions and external memory interface, not contained in a conventional CSMP system. It contains integrated multiple central processing units with high complexity memory architectures plus peripherals (i.e. DMA, UART, USB functions), plus local system memory and perhaps an interface to external memory if a large amount of memory is required. The central processing unit interactions and cache interactions on an embedded central processing unit are similar but much more complex than the CSMP case. These interactions must comprehend the cache interfaces with on-chip system memory and peripheral interfacing. Since the embedded processor is often used in a real-time environment, interrupt operations and the manner of controlling and reducing power consumption are handled differently.

In summary, the basic difference between the conventional symmetric multiprocessor (CSMP) and the embedded symmetric multiprocessor (ESMP), is that the conventional CSMP is simply a computing processor while the embedded symmetric multiprocessor ESMP is an integrated system having one or more central processing units plus a full complement of peripherals. A non-embedded CSMP deals with a simpler central processing unit-cache interface with minimal concerns for what happens beyond. An embedded ESMP must resolve a greater complexity of system interactions and interface requirements.

Both single-processor, instruction-level parallelism ILP architectures and the multi-processor architectures increase system performance by taking advantage of parallelism but at different levels of abstraction. A single processor ILP architectures takes advantage of unrelated central processing unit instructions that can be executed concurrently. The multiprocessor approach takes this a step further and makes use of unrelated application fragments that can be run concurrently. The instruction-level parallelism (ILP) approach has a very tight coupling between parallel operating units (i.e. execution units inside the core) and is completely hardware and software controlled. As a result, the parallelism is invisible to the user. The multiprocessor approach has very loose coupling between parallel operating units (i.e. separate processors) with minimal hardware and software interference. As a result, the parallelism is not only visible to the user, but system performance gain is dependent upon efficient division of the application. In applications that run more than one software process, there resides another level of parallelism in-between these two extremes: process level parallelism.

This invention includes a software process level that seeks system performance gain in process level parallelism using multiple central processing units. When a program first boots, the kernel, which may be either part of a real time operating system (RTOS) or custom-developed boot code, will schedule which parts of the application will be executed at which time. Some processes are launched based on a conditional event, such as the completion of a previous process or external event. However most major processes have some degree of independence from one another in a multi-tasking environment. The supervisor code from either the operating system or the boot-code schedules central processing unit time for each process, based on its priority. It is at this central processing unit scheduling point that additional performance can be gained through the use of multiple central processing units.

Figure 2:
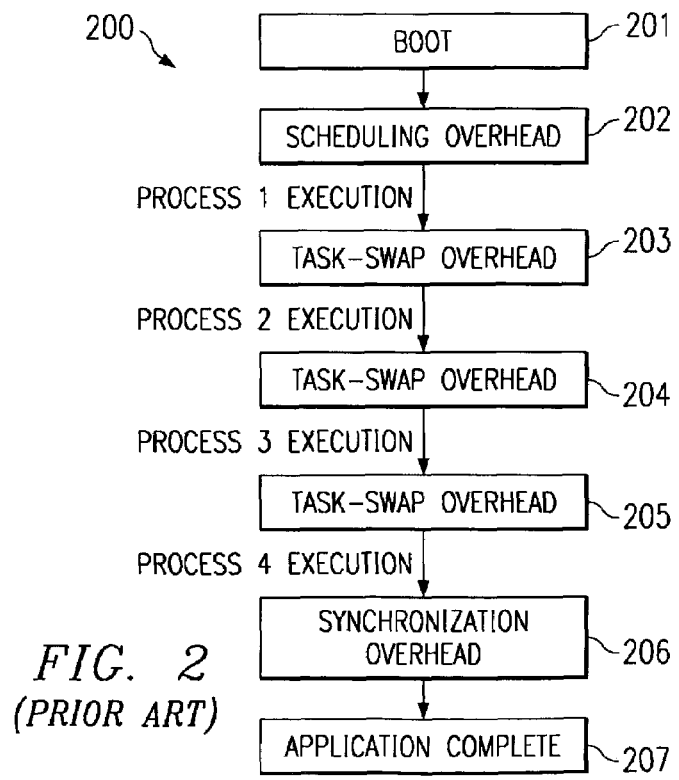
FIG. 2 illustrates the execution time of plural processes by single-processor in accordance with the prior art.
Figure 3:
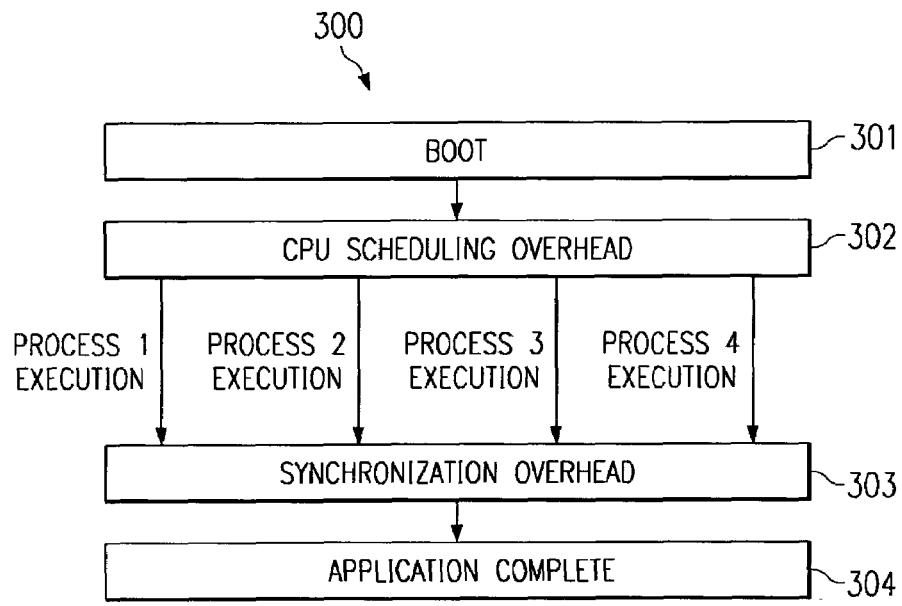
FIG. 3 illustrates the execution time of plural processes by a multi-processor systems in accordance with the prior art.

Instead of time-sharing all processes on a single central processing unit, the supervisor can split these processes among two or more central processing units. FIGS. 2 and 3 illustrate these two alternatives. FIG. 2 illustrates an example of the execution time for a complex process running on a single central processing unit system. FIG. 3 illustrates that same process running on a multiple central processing unit system. In these examples, four separate single processes are running.

On the single central processing unit system 200, each process is time shared on the single central processing unit. The operating system or boot kernel 201 begins the process. Initially there is some scheduling overhead 202. The single processor then executes processes 1, 2, 3 and 4 in sequence. Proceeding from one process to the next process adds some task-swap overhead 203, 204 and 205. There is synchronization overhead 206 and then the application is complete at 207.

On the multiple central processing unit system 300, the application begins with operating system or boot kernel 301. Initially there is some scheduling overhead 302. A corresponding single processor then executes each of the processes 1, 2, 3 and 4 in parallel. There is synchronization overhead 303 and then the application is complete at 304.

Adding additional central processing units to execute parallel processes, however, does not come without risk. Parallelism is now found at the software process level, independent of the level at which the application programmer interacts. Writing an application for such a parallel system is much like writing an application for a single processor case. The application programmer is not concerned about when code will be scheduled to run. Only the operating system or boot-code scheduler takes that into account. This is a major benefit, since it is as easy to create applications on such a system as a single processor-based system and higher system performance is realizable. Only the operating system or boot-code programmer needs to be aware of the hardware. However this also presents unique challenges, since the application programmer is normally unaware of the hardware and the system must execute such code just as if it was made up of a single processor.

Any data shared between processes must be kept coherent. As a result, the software-processed based multiprocessor is less flexible in hardware than an application-division based multiprocessor. However, development on such a system is much easier and more scalable, allowing for greater degrees of parallelism and hence higher performance.

When hardware runs a software-process based multiprocessing solution it is required to keep shared data coherent. The application software written for a single-processor system must run correctly on a multiprocessor system. Through the use of symmetric multiprocessing (SMP), it is possible to satisfy both of these conditions. Conventional symmetric multiprocessing systems CSMP are commonly employed on desktop PCs (dual central processing units) and small-scale (4-way or 8-way) servers. Many of the same techniques can be used in an embedded application, but can be enhanced further by the tighter integration of an embedded central processing unit. Additional hardware can be employed to allow for better real-time determinism such as interrupts and peripheral management.

Symmetric multiprocessing derives its name from the premise that each central processing unit in the system behaves exactly the same as any other. All central processing units run the same instruction set, at the same frequency and all have access to all system resources. This is needed, because applications are written as if they are to be run on a single central processing unit. As a result, all central processing units that can run a process need to appear identical.

One of the greatest challenges to an SMP system is in keeping data coherent. Since the operating system or boot-code scheduler will launch different processes on each processor, any data that is used by more than one process must be kept current. A central processing unit that changes a shared variable must have that change reflected in the other central processing units. This may be done by having a large shared memory. By definition such a large shared memory does not allow for any local data memory. For performance and data coherence reasons, a data cache must also be employed when the base central processing unit instruction set does not support multiprocessing.

The embedded symmetric multiprocessing ESMP architecture of this invention will not have any serial message passing. All data is kept in the shared memory and information is passed between processes in the form of shared variables. This is just the same as in the single-processor case, where the central processing unit will access the same memory locations for shared data between processes. However, in a multiprocessor model, shared-resources can be a bottleneck since only one central processing unit can have access to the data at a given time.

The greatest challenge from a data integrity viewpoint is making sure central processing unit registers are updated with any changes to the shared variables that may be stored. This is most conveniently done using good documentation and disciplined programming habits, declaring any variable or pointer that can be changed as a volatile type. This will force the central processing unit to load from main memory a new value into the register file any time the variable is used. However, since this is not a requirement in the single-processor case, it will cause a slight burden to the end application programmer in directly porting existing code. Changes to the compiler can also guarantee register coherence, since the compiler can generate code that will always reload data from main memory.

Figure 4:
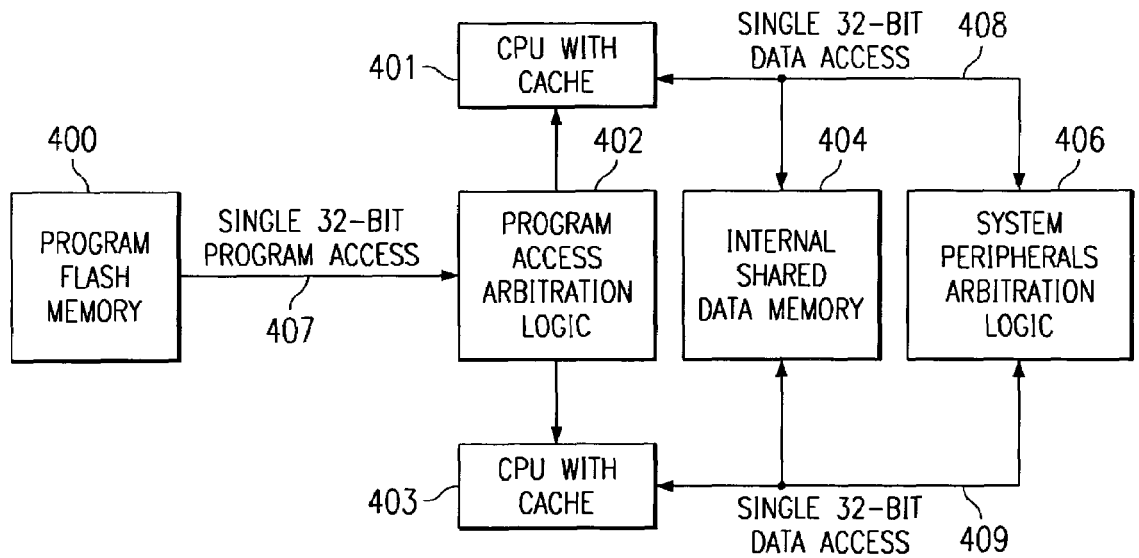
FIG. 4 illustrates an example embedded symmetric multiprocessing system to which the invention is applicable.

FIG. 4 illustrates a first generation 2-way embedded symmetric multi-processor ESMP architecture. A single flash memory 400 stores a single program stream. Both central processing units 401 and 403 receive their instructions from flash memory 400 via instruction bus 407 and program access and arbitration logic block 402. When an instruction cache miss occurs, arbitration logic 402 determines which processor has priority access to the flash memory 400. Both central processing units 401 and 403 receive their data likewise from the same source, internal shared data memory 404. All system resources are shared and visible to central processing units 401 and 403. Both central processing units 401 and 403 run the same instruction set and have identical organizations. Similarly, system peripherals and arbitration logic 406 is shared by both central processing units 401 and 403. Central processing unit 401 interacts with internal shared data memory 404 and systems peripheral arbitration logic block 406 via 32-bit data access bus 408. Central processing unit 403 interacts with internal shared data memory 404 and systems peripheral arbitration logic block 406 via 32-bit data access bus 409.

Rewrite the paragraph at page 16, line 25 to page 17, line 12 as follows:

As illustrated in FIG. 4, program instructions are kept in a single external flash memory device 400. Alternately the instructions may be stored in an internal ROM, not shown. This is the same as the single-processor model. Since there is only one path to the instruction memory and each central processing unit 401 or 403 needs to access the program memory on nearly every cycle, the processors require an instruction cache for cycle performance reasons. This differs somewhat than a single-processor case, where the instruction cache is used due to variations in memory speed. Even if all of the program is kept internal to the device, an instruction cache near each central processing unit is needed. This prevents a performance bottleneck from occurring during program memory access arbitration. When both central processing units 401 and 403 suffer a cache miss, program access arbitration logic 402 will stall one central processing unit based on hardware priority while the other central processing unit refills its cache line.

Figure 5:
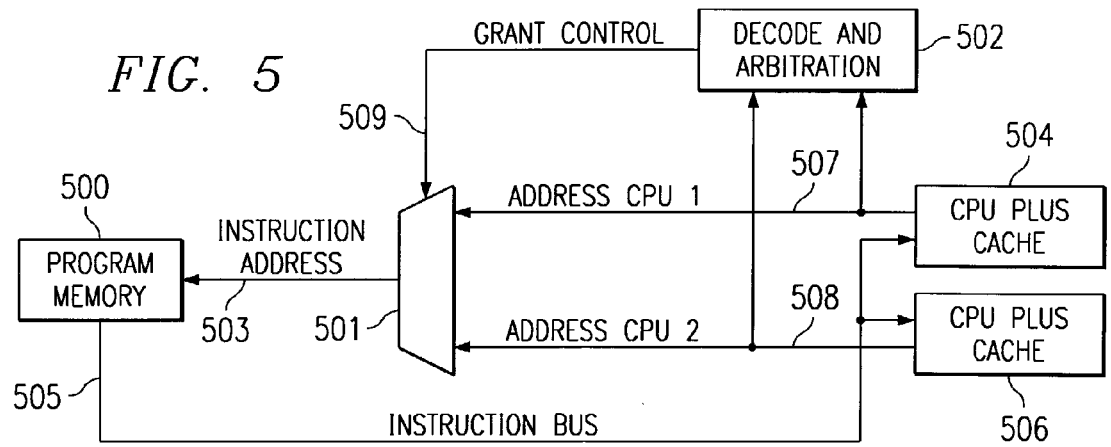
FIG. 5 illustrates the block diagram for program memory access in an embedded symmetric multi-processing system of this invention.

FIG. 5 is a block diagram of the program memory access arbitration logic 402. FIG. 5 illustrates the relationship of CPU instruction cache to the simplified instruction decode and arbitration. Decode and arbitration block 502 decides whether a central processing unit may access the program memory after a cache miss. If only one central processing unit, for example central processing unit 504, makes an access request to program memory 500, then decode and arbitration block 502 will grant that central processing unit request without requiring a pause in the other central processing unit, central processing unit 506 in this example. If both central processing units 504 and 506 make a request to the program memory 500 simultaneously, decode and arbitration block 502 decides which central processing unit has priority and provides access via grant control input 509 to multiplexer 501. Multiplexer 501 routes the required instruction address 503 from the enabled central processing unit to the program memory 500. Program memory 500 passes the requested instruction via instruction bus 505 to both central processing units 504 and 506. The enabled central processing unit accepts the instruction. The other central processing units remain in a wait state.

The issues surrounding data coherence has been given some consideration above in the general treatment of the SMP. For an embedded ESMP system, when the base central processing unit has not been designed specifically to support multiprocessing, a multi-port RAM module may not be used. Although multi-port RAMs offer the best performance and simplest interconnect, data consistency cannot be maintained without major effort. Data consistency must instead be maintained with assistance from arbitration logic. Since access to the data memory is extremely common, some form of cycle performance improvement needs to be considered. As a result, two alternatives are proposed below.

Just as an instruction cache is a requirement, a data cache is also needed in a single-port memory interface. With data caches, the central processing unit will not require access to the main memory on nearly every cycle. However, unlike instruction caches, data caches will involve write cycles. As a result more issues with maintaining data coherency arise. When a shared variable is present in more than one central processing unit cache and when one central processing unit changes the variable, this variable must be updated in the other central processing unit cache. A common technique employed to maintain consistency, called bus snooping, is outlined below.

Figure 6:
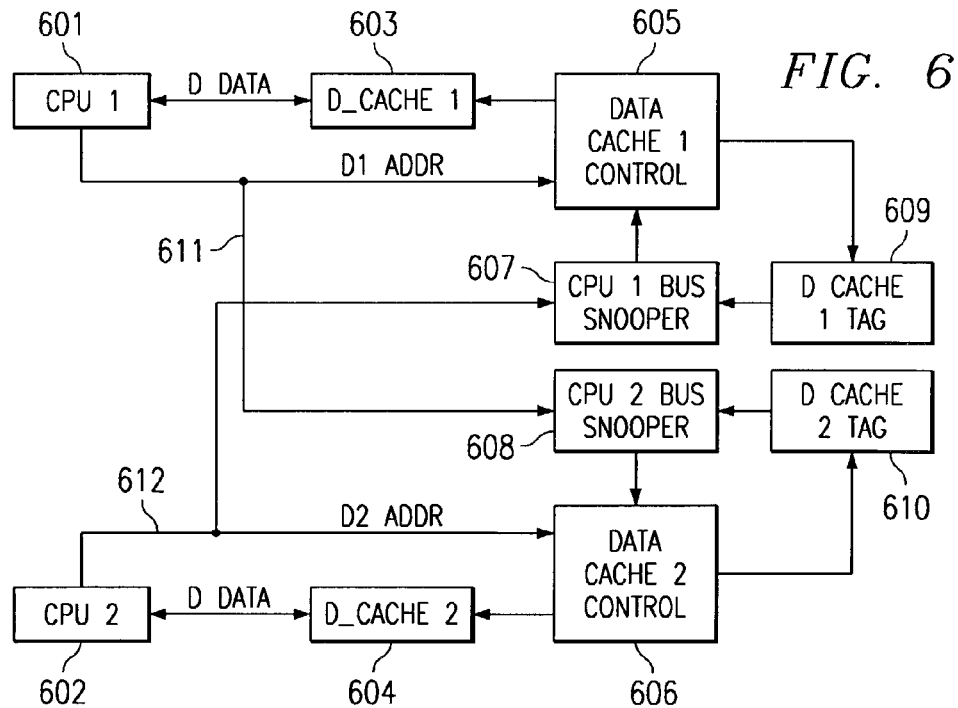
FIG. 6 illustrates the block diagram for data cache snooping in an embedded symmetric multi-processing system of this invention.

FIG. 6 illustrates an example of bus snooping for a 2-way ESMP system. Bus snooper 608 of FIG. 6 monitors D1 address bus 611 of central processing unit 601. Bus snooper 607 monitors D2 address bus 612 of central processing unit 602. Bus snooper 607 compares the tag values of the address on D2 address bus 612 with the tags stored in data cache tag block 609. If a match is found, bus snooper 607 signals data cache control block 605 to invalidate that line in its data cache 603. Bus snooper 608 operates similarly with data cache tag block 610, data cache control block 605 and data cache 604.

If there are more than two central processing units, the cache control block for each central processing unit must monitor the activity on all of the other central processing unit caches in the multiprocessor system. A bus snooper compares the tags of its cache with the tag values of the address bus to all of the other caches. A write-through scheme, where each central processing unit writes shared data back to its cache and to main memory is the only method that works reasonably in such a shared-memory architecture. If the tag is present in the cache of another central processing unit, the cache controller must invalidate that line in its cache.

From the hardware perspective, dividing memory into blocks offers the most direct alternative to a dual-port memory. However, this technique carries with it the greatest burden to the end user, potentially lower performance and least efficient use of memory. Basically, the entire memory module could be broken down into smaller modules, for example 1 Kbyte in size, with arbitration for similar or identical to the single memory module case. As long as both central processing units do not attempt to access the same module at the same time, no bottlenecks will occur. One problem with this approach is that it wastes memory since there will always be gaps in between memory modules. Another significant problem is that the linker may not efficiently spread the variables across the blocks, and hot spots can easily occur.

Figure 7:
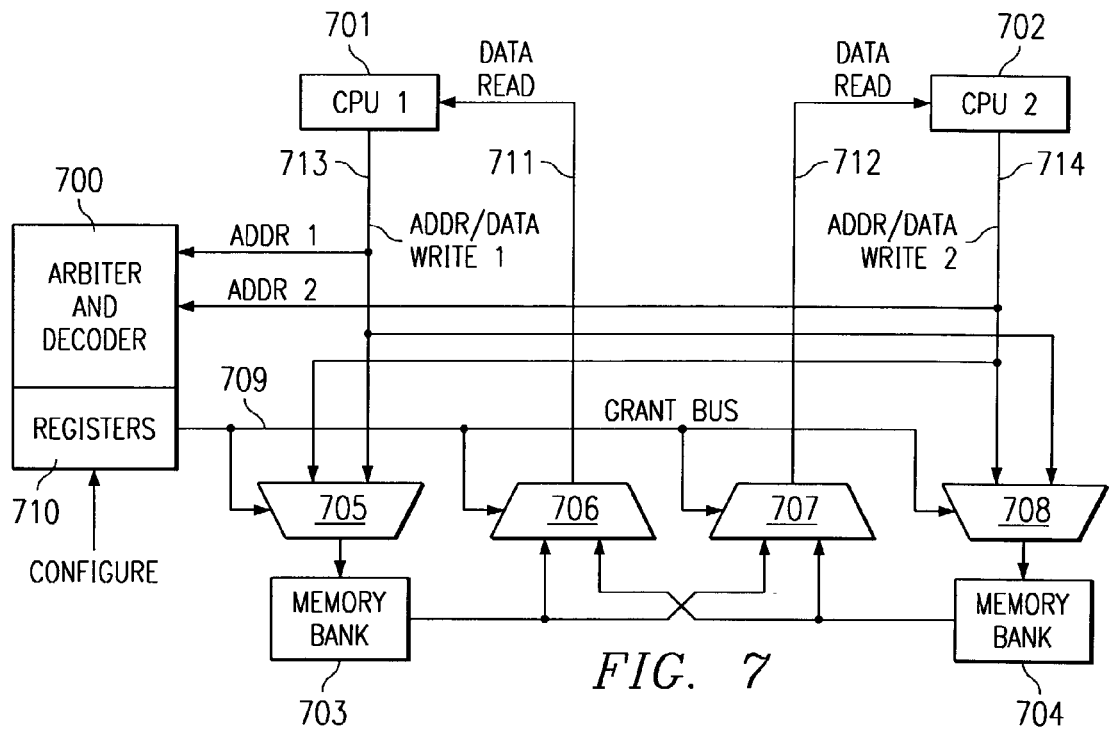
FIG. 7 illustrates the block diagram of division of system memory into banks in an embedded symmetric multi-processing system of this invention.

FIG. 7 illustrates a system with 2 Kbytes of data memory divided into two 1 Kbyte blocks. Both central processing units 701 and 702 can access the main memory, which is divided into two memory blocks 703 and 704, so long as they access separate blocks. If both central processing units attempt to access the same block, one will be placed in a wait condition.

Arbiter and decoder 700 receives the address from address/data bus 713 of central processing unit 701 and from address/data bus 714 of central processing unit 702. Arbiter and decoder 700 controls multiplexers 705, 706, 707 and 708 via grant bus 709. Multiplexer 705 supplies address and data from either address/data bus 713 from central processing unit 701 or address/data bus 714 from central processing unit 702 to memory bank 703. Multiplexer 706 supplies the read data output from either memory bank 703 or memory bank 704 to data read bus 711 of central processing unit 701. Multiplexer 707 supplies the read data output from either memory bank 703 or memory bank 704 to data read bus 712 of central processing unit 702. Multiplexer 708 supplies address and data from either address/data bus 713 from central processing unit 701 or address/date bus 714 from central prodessing unit 702 to memory bank 704.

If only one central processing unit 701 or 702 seeks access, arbiter and decoder 700 signals the appropriate multiplexers 705, 706, 707 and 709 via grant bus 709 to permit access to the addressed memory block 703 or 704. If central processing unit 701 and 702 attempt to access opposite memory banks 703 and 704, arbiter and decoder 700 permits both accesses. For example, suppose central processing unit 701 attempts access to memory bank 703 and central processing unit 702 attempts access to memory bank 704. Arbiter and decoder 700 signals multiplexer 705 to select the address and data (if this is a write) from address/data bus 713 of central processing unit 701, multiplexer 706 to select data output from memory bank 703 on a read by central processing unit 701, multiplexer 707 to select the data output from memory bank 704 on a read to central processing unit 702 and multiplexer 708 to select the address and data (if this is a write) from address/data bus 714 of central processing unit 702. Arbiter and decoder 700 would command the opposite selections if central processing units 701 and 702 requested the opposite accesses.

If both central processing units 701 and 702 request access to the same memory bank 703 or 704, arbiter and decoder 700 permits one requested access by appropriate signals on grant bus 709. The central processing unit permitted access is selected based on an arbitration scheme, such as round robin access. The other central processing unit is given a wait state. This central processing unit will arbitrate for access again on the next memory cycle.

In order to support the various software techniques employed to maintain data integrity, this invention supports a basic hardware primitive that allows an atomic read and modify of memory. In a desktop CSMP system, this hardware primitive usually takes the form of a special instruction or instruction pair in the base processor that will perform an atomic read-modify of memory. However current embedded processors do not support this type of instruction. As a result the embedded ESMP system hardware must perform the same task.

To illustrate the need for an atomic read-modify of memory, consider the following. A shared variable used to represent a software lock exists in a portion of memory that two or more central processing units may attempt to access. Suppose a first central processing unit wins arbitration and reads the lock. On the following cycle, a second central processing unit reads the lock. The first central processing unit then determines that the lock is not set and writes a set lock command to memory. This is after the second central processing unit has also read the lock as being 'not set'. The first central processing unit performs the task that the lock was intended to protect correctly, however, the second central processing unit may perform the task that the lock was intended to prevent it from performing. This causes program behavior that was not intended. An atomic read-modify memory operation is needed.

Without having a special instruction inside the central processing unit to perform this atomic read-modify memory operation, the system hardware will be required to handle it. The most direct approach is as follows. Arbiter and decoder 700 monitors all data accesses from the central processing units. If one central processing unit reads a memory location, it will not allow another central processing unit to read the exact same memory location for a given number of cycles. The number of cycles of this delay is stored in registers 710 in arbiter and decoder 700. These registers 710 are preferably configurable by system software. The number of cycles should be the number of cycles needed for the base central processing unit to read, analyze and then write back the result. In order to insure the fastest possible read-modify memory operation, all exceptions to the central processing unit should be disabled during this process (i.e. no interrupts). The operating system or low-level routines could provide a function called 'set_lock (*lock_location)' that will disable all exceptions, read the lock memory value, determine its state, and the set the lock by writing to memory if it is not already set. This would allow the application programmer to be removed from any concerns with the hardware and would also avoid creating a burden on the end application programmer. Since most 'lock-setting' is done by the central processing unit code scheduler as part of the operating system, there is no impact on the application programmers.

Just as all the memory is shared in an ESMP system, a single set of system peripherals are also shared. Fortunately, the system peripherals provide an easier model for data coherence than memory. First, most peripherals are not in the critical path. Thus these peripherals can be arbitrated for using a simple multiplexed solution. Second, since the peripheral hardware can change its contents in the same fashion as a single-processor case, issues of register and variable consistency remain the same in both the single-processor and multiprocessor case. Most variables associated with the peripheral set are already declared with the volatile keyword.

Figure 8:
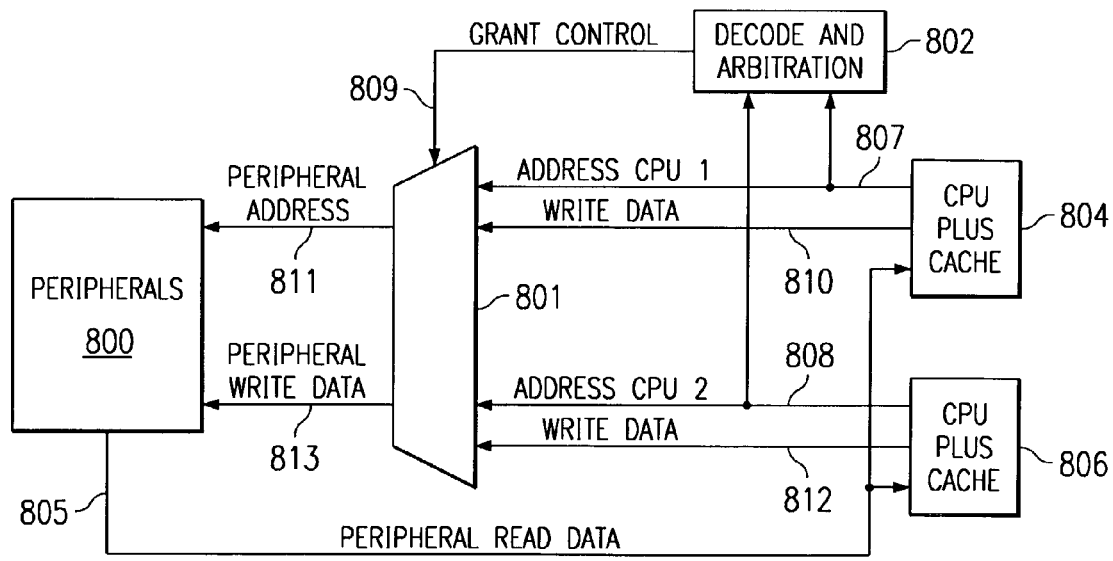
FIG. 8 illustrates the block diagram of the peripheral arbitration function in an embedded symmetric multi-processing system.

FIG. 8 illustrates a simplified peripheral decode and arbitration block diagram. This is very similar to the instruction memory decode and arbitration, except that the central processing units can also write data via paths 810 and 812. At the system level, the decode and arbitration block 802 for peripherals 800 can be the same as decode and arbitration block 500 for program memory 500. Unlike a traditional desktop based CSMP system, an embedded ESMP system may have some peripherals that are in the critical path of the system. In such a system, the kernel or operating system scheduler can schedule all of the real-time peripheral actions to be on a single processor. Then, decode and arbitration block 802 can have a programmable priority setting, allowing the scheduler code to program a value in a control register granting immediate priority to a certain central processing unit. The value programmed could be the central processing unit number that the scheduler intends to use for the real-time application.

FIG. 8 illustrates the logic to accomplish this function. Decode and arbitration block 802 receives the peripheral address from central processing unit 804 via address bus 807 and from central processing unit 806 via address bus 808. Decode and arbitration block 802 controls multiplexer 801 via grant bus 809 to select either peripheral address bus 807 and write data bus 810 from central processing unit 804 or peripheral address bus 808 and write data bus 812 from central processing unit 806. The other central processing unit is given a wait state and can arbitrate for access to the peripheral on the next cycle. The peripheral output data is supplied on peripheral read data bus 805 to both central processing units 804 and 806. Only the requesting central processing unit will accept this data.

If more than one process is using the same peripheral at the same time, software barriers or locks will be required. Whenever the operating system or kernel is about to launch a process that contains a peripheral access, it must check the lock on the peripheral. The lock for each peripheral is usually nothing more than a shared variable. When the process is finished with the peripheral, it must release the lock. These locks are handled by the driver for the peripheral, which is usually part of the operating system. Note that this is only important if the processes will use the peripheral in different ways. If the same UART configuration is to be used by all processes, for example, a lock may not be required. Since code associated with a peripheral is handled by a low-level driver or operating system, there should be no application code impact at the top level. However, for a more deeply embedded system that intermixes peripheral operations and application code, locks may have to be introduced into the application code if needed.

Due to the fact that only one peripheral set exists for an SMP system, if the application requires a great amount of peripheral access, the amount of parallelism that can be extracted is minimal. However, different central processing units can access different peripherals at the same time because each peripheral can have an independent arbitration scheme. Performance can still be gained so long as a single peripheral does not cause a bottleneck.

What is claimed is:

1. A data processing device disposed on a single integrated circuit comprising:
    a plurality of identical central processing units operable on instructions of a single instruction set;
    a single program memory storing instructions for all of said plurality of central processing units;
    program access arbitration logic connected to each of said plurality of central processing units and said program memory, said program access arbitration logic receiving program memory access requests from said plurality of central processing units and operable to
        arbitrate among plural central processing units generating program memory access requests simultaneously, and
        supply an instruction from said program memory to a selected single requesting central processing unit at a time;
    a shared memory storing data at a plurality of addresses; and
    shared memory access arbitration logic connected to each of said plurality of central processing units and said shared memory, said shared memory access arbitration logic receiving data access requests from said plurality of central processing units and operable to
        supply data from said shared memory to a requesting central processing units if a single central processing unit generates a data access request for said shared memory,
        if plural central processing units simultaneously request access to said shared memory, arbitrating among said central processing units for access, supplying data from said shared memory to a selected single central processing unit at a time and, placing other central processing units requesting access to said shared memory into a wait condition, and
        following read access by a central processing unit to one of a predetermined set of addresses in said shared memory, prohibiting read access to the one address by another central processing unit for a predetermined number of a plurality of memory cycles.

2. The data processing device of claim 1, wherein:
    each of said plurality of central processing units includes an instruction cache operable to cache instructions stored in said single program memory.

3. The data processing device of claim 1, wherein:
    said shared memory access arbitration logic includes a data register, said data register storing said predetermined number of memory cycles when memory access by another central processing unit is prohibited to each of said predetermined set of addresses.

* * * * *